US009139301B2

(12) United States Patent
Slyter et al.

(10) Patent No.: US 9,139,301 B2
(45) Date of Patent: Sep. 22, 2015

(54) DIVIDER CURTAIN

(71) Applicant: The Boeing Company, Seal Beach, CA (US)

(72) Inventors: Kenneth M Slyter, Kent, WA (US); Paul W Morcom, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 210 days.

(21) Appl. No.: 13/712,854

(22) Filed: Dec. 12, 2012

(65) Prior Publication Data
US 2014/0158310 A1 Jun. 12, 2014

(51) Int. Cl.
*B64D 11/00* (2006.01)

(52) U.S. Cl.
CPC .......... *B64D 11/0023* (2013.01); *B64D 11/003* (2013.01); *Y02T 50/46* (2013.01)

(58) Field of Classification Search
CPC ............................... B64D 11/23; B64D 11/003
See application file for complete search history.

(56) References Cited

U.S. PATENT DOCUMENTS

| | | | |
|---|---|---|---|
| 4,899,962 A * | 2/1990 | Mueller | 244/129.2 |
| 5,165,626 A | 11/1992 | Ringger et al. | |
| 5,816,534 A * | 10/1998 | Schumacher | 244/119 |
| 7,530,529 B2 * | 5/2009 | Bock | 244/118.5 |
| 2008/0229547 A1 | 9/2008 | Michel | |
| 2009/0224103 A1 | 9/2009 | Neumann et al. | |

FOREIGN PATENT DOCUMENTS

| | | | |
|---|---|---|---|
| DE | 4119623 C1 * | 10/1992 | B64D 11/00 |
| WO | WO2012084651 | 6/2012 | |
| WO | WO2013142660 | 9/2013 | |

OTHER PUBLICATIONS

European Patent Office; Search Report for Application No. EP13195626 dtd Feb. 24, 2014.
Canadian Intellectual Property Office; Office Action issued in CA 2,833,875 dated Feb. 5, 2015 (May 2, 2015).

* cited by examiner

*Primary Examiner* — Philip J Bonzell
*Assistant Examiner* — Michael Kreiner
(74) *Attorney, Agent, or Firm* — Parsons Behle & Latimer

(57) ABSTRACT

A curtain divider for an aircraft interior containing pivot stow bins includes a first fabric curtain, having an outboard end and an inboard end, which is attachable to the aircraft interior only at the outboard and inboard ends. The first fabric curtain includes a vertical portion, and a horizontal portion. The vertical portion has a substantially straight bottom edge, and an arcuate top edge defining a space sufficient for opening the pivot stow bins. The horizontal portion is flexibly attached to the vertical portion along the top edge and extends from the outboard end to the inboard end, having a substantially continuous curvature. The horizontal portion is adapted to impart forward and aft stability to the curtain support member at the top edge.

20 Claims, 7 Drawing Sheets

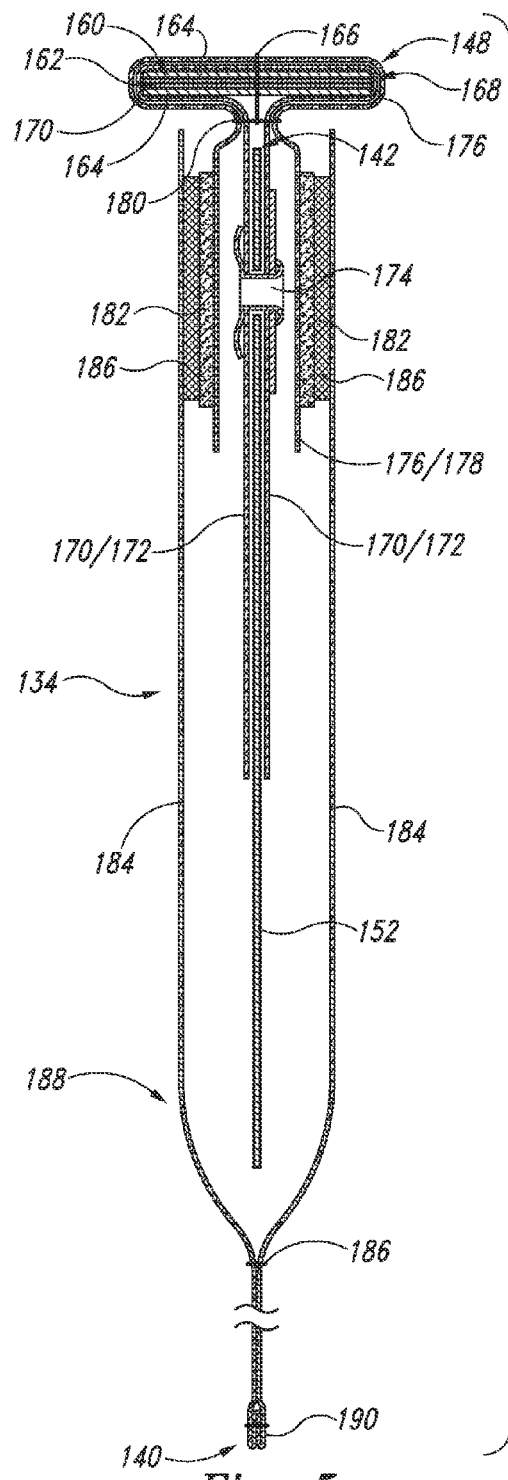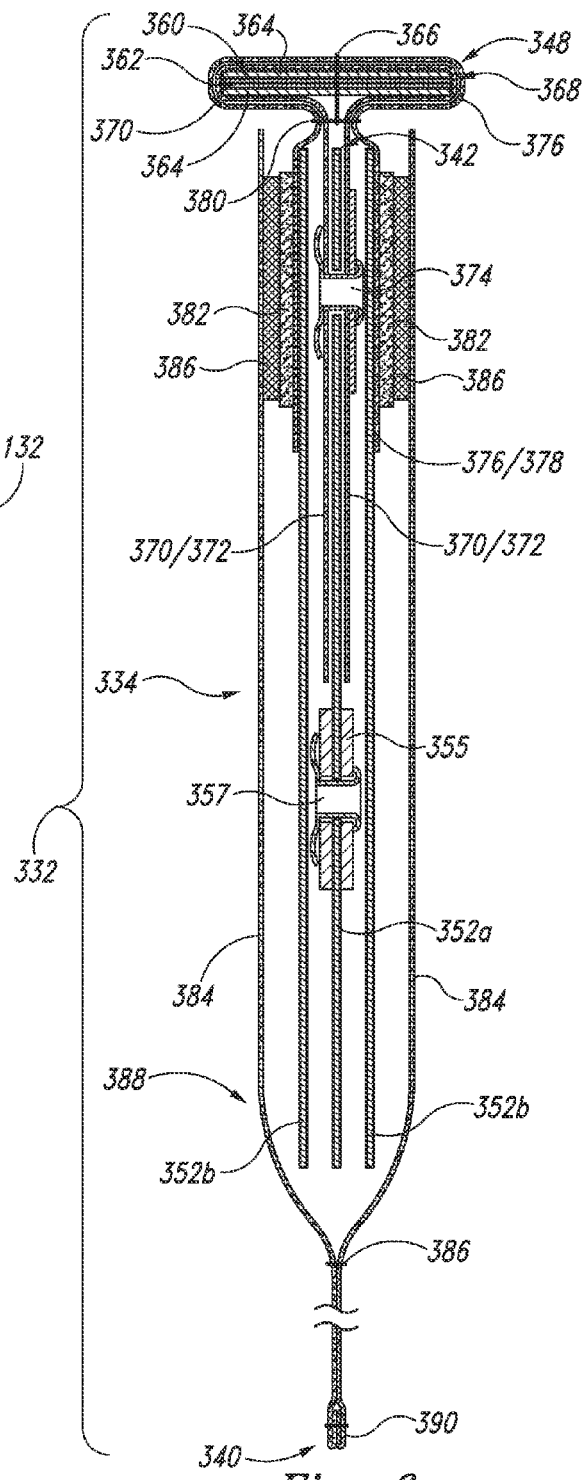

DIVIDER CURTAIN

BACKGROUND

1. Technical Field

The present disclosure relates generally to dividers for aircraft cabins. More specifically, the present disclosure relates to an aircraft cabin divider curtain that is composed of flexible elements, and is adaptable to aircraft having pivot-type overhead stowage bins.

2. Related Art

Many aircraft utilize a dividing structure such as a wall or a curtain to separate sections within an aircraft cabin, such as between different classes of seats (e.g. first class vs. economy class). Divider walls are one means of division between sections of an aircraft cabin, but add weight and potentially reduce the passenger capacity of the aircraft by eliminating seat rows to make room for the divider wall. Additionally, rigid walls and their structural supports involve significant structural design, analysis and testing in order to be certified.

This is also the case with many structural supports associated with curtains that are used as cabin dividers. Aircraft curtains frequently include tracks, rods, or other rigid structural supports, which can be a safety concern if they come loose during an emergency situation, and therefore involve structural substantiation in order to be certified.

Another aspect that relates to aircraft cabin dividers is the interior configuration and appurtenances of the aircraft. Many aircraft use shelf-type overhead stowage bins. The lower surface of these bins provides a convenient, stable attachment location for a curtain track. However, many commercial aircraft are transitioning from shelf-type bins to pivot-type overhead stowage bins. Rather than providing a fixed, nearly horizontal shelf that extends from the aircraft sidewall toward the aisle, pivot-type bins employ a rotating container, which largely eliminates the fixed horizontal panel. This eliminates most of the fixed support structure for a structural track between the aisle and sidewall.

The present disclosure is directed toward addressing at least one of the above issues.

SUMMARY

It has been recognized that it would be desirable to have a divider for an aircraft cabin that is lightweight and flexible, and does not include large rigid parts.

It has also been recognized that it would be desirable to have a divider for an aircraft cabin that is compatible with pivot-type overhead stowage bins.

Advantageously, the present disclosure provides a curtain divider for an aircraft interior containing pivot stow bins. The curtain divider includes a first fabric curtain, having an outboard end and an inboard end, and is attachable to the aircraft interior only at the outboard and inboard ends. The first fabric curtain includes a vertical portion, and a horizontal portion. The vertical portion has a substantially straight bottom edge, and an arcuate top edge defining a space sufficient for opening the pivot stow bins. The horizontal portion is flexibly attached to the vertical portion along the top edge and extends from the outboard end to the inboard end, having a substantially continuous curvature. The horizontal portion is adapted to impart forward and aft stability to the curtain support member at the top edge.

In another embodiment, the present disclosure provides an aircraft having an interior with pivot stow bins and a curtain divider. The curtain divider includes a substantially vertical fabric panel, having an outboard end, an inboard end, a substantially straight bottom edge, an arcuate top edge, and a top flange, disposed along the top edge. The vertical panel is attachable to the aircraft interior at the inboard end inboard of a pivot stow bin, and at the outboard end below the passenger service unit near a sidewall of the aircraft. The top flange is oriented substantially perpendicular to the vertical panel, the vertical panel fabric enclosing and flexibly attaching the fabric panel and the top flange as an integral unit. The top flange has an unsupported span between the outboard end and the inboard end and defines a lower boundary of a space suitable for opening the pivot stow bins.

In another embodiment, the present disclosure provides a method for creating a curtain divider for an aircraft interior containing pivot stow bins. The method includes creating a vertical panel having a curved upper edge defining a lower boundary of a space suitable for opening the pivot stow bins, and a substantially straight lower edge, flexibly attaching a top flange of fabric material to the vertical panel within a fabric sleeve along the upper edge, and attaching connectors to inboard and outboard ends, respectively, of the curved upper edge. The connectors are the sole attachment points to attach the vertical panel to the aircraft interior The present invention will now be described more fully with reference to the accompanying drawings, which are intended to be read in conjunction with both this summary, the detailed description, and any preferred or particular embodiments specifically discussed or otherwise disclosed. This invention may, however, be embodied in many different forms and should not be construed as limited to the embodiments set forth herein; rather, these embodiments are provided by way of illustration only so that this disclosure will be thorough, and fully convey the full scope of the invention to those skilled in the art.

BRIEF DESCRIPTION OF THE DRAWINGS

FIG. 5 is a cross-sectional view of the divider curtain of FIGS. 1 and 2.

FIG. 6 is a cross-sectional view of an alternative cross-sectional configuration of a divider curtain in accordance with the present disclosure.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the scope of the present invention. The following detailed description is, therefore, not to be taken in a limiting sense.

As noted above, curtains that are used to divide different sections of an aircraft interior frequently include tracks, rods, or other rigid structural supports, which can be a concern with respect to emergency load conditions because of the desire to eliminate potential projectiles. Additionally, aircraft with pivot-type stow bins, rather than shelf-type bins, largely lack a fixed support structure for a structural track between the aisle and sidewall. As disclosed herein, a divider for an aircraft interior has been developed that is lightweight and flexible, does not include large rigid parts, and is compatible with pivot-type overhead stow bins.

Figure 1:
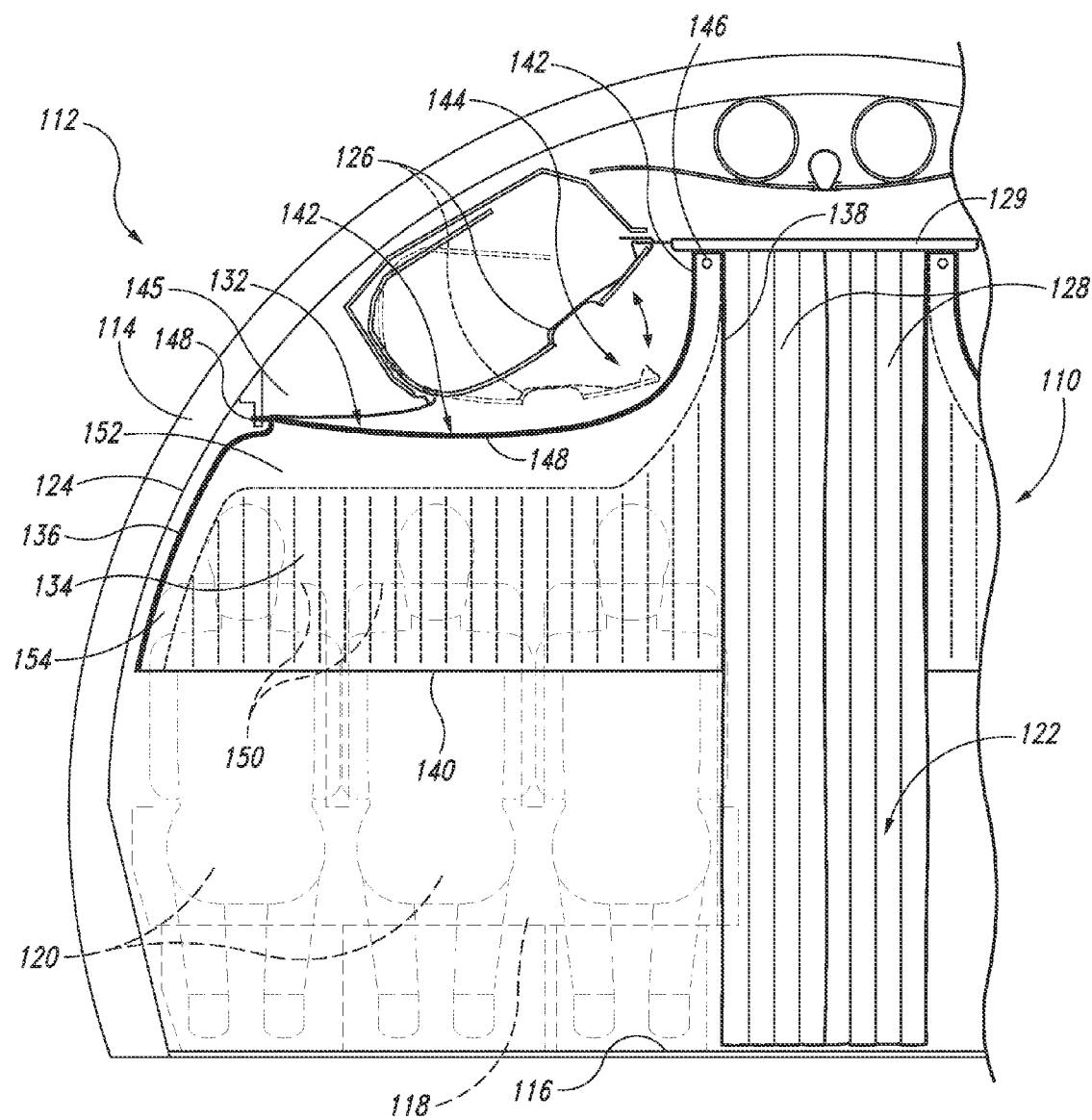
FIG. 1 is a partial cross-sectional view of an aircraft cabin having an embodiment of a divider curtain in accordance with the present disclosure.

Shown in FIG. 1 is a partial cross-sectional view of a cabin 110 of an aircraft 112. The aircraft 112 generally includes a curved outer fuselage structure 114, a cabin floor 116, and passenger seat structures 118 for passengers 120. A space between the rows of passenger seat structures 118 provides a center aisle 122 for the aircraft. The aircraft interior includes sidewalls 124 and pivot-type overhead stowage bins 126, which are shown in both closed and open positions in FIG. 1.

The center aisle 122 of the aircraft includes an aisle curtain 128, slidingly attached to a cross-aisle header 129, which is a rigid beam-type structure that spans the aisle overhead, and attaches adjacent to the overhead bins 126. The aisle curtain extends from the cross-aisle header 129 almost to the cabin floor 116, and can be opened or retracted by manually sliding the curtain upon a sliding track that is part of the header 129.

Figure 2:
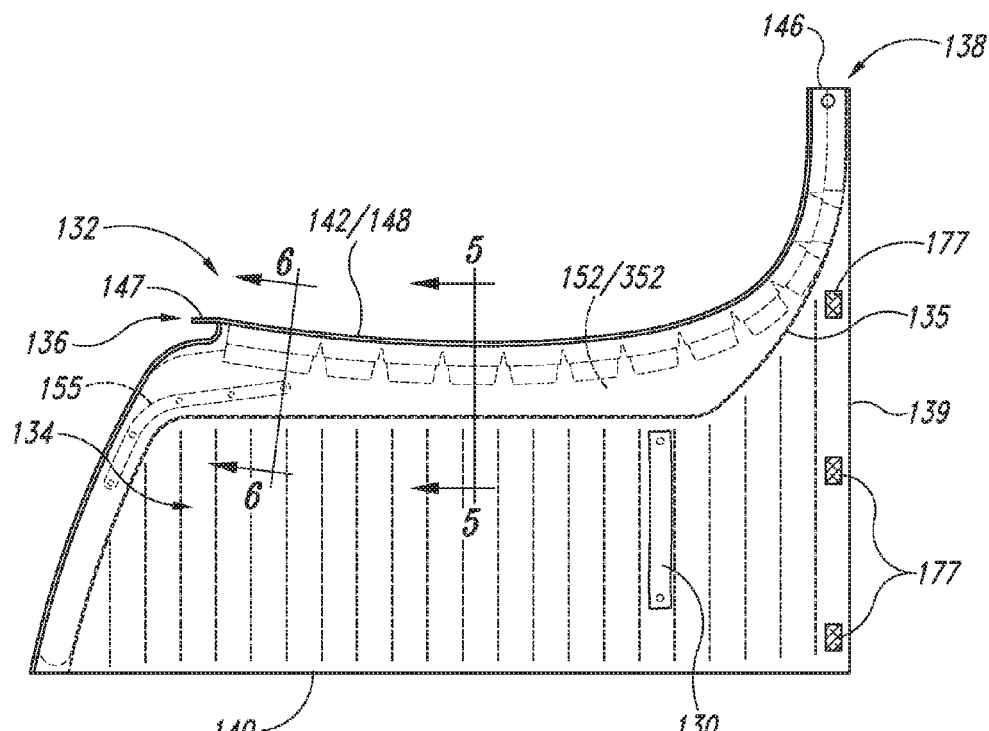
FIG. 2 is a plan view of the divider curtain of FIG. 1, separated from the aircraft.

The cabin 110 shown in FIG. 1 also includes an embodiment of a divider curtain 132 in accordance with the present disclosure. A front view of this divider curtain 132, separate from the aircraft 112, is also shown in FIG. 2. The divider curtain 132 includes a substantially vertical fabric panel 134, having an outboard end 136, an inboard end 138, a substantially straight bottom edge 140, and an arcuate top edge 142 defining an opening space 144 for the pivot stow bins 126. The panel 134 is attachable to the aircraft interior at its inboard end 138 inboard of the pivot stow bin 126, and at the outboard end 136 below the passenger service unit 145 near the sidewall 124 of the aircraft. The inboard attachment point 146 in this embodiment is upon the center aisle header 129, and the outboard attachment point 147 can be along an outboard AC rail.

The vertical panel 134 of the divider curtain 132 includes a top flange 148, which is disposed along the top edge 142 of the panel and is oriented substantially perpendicular to it. The outer surface of the panel 134 is covered in fabric, discussed in more detail below, which wraps around and flexibly attaches the fabric panel 134 and the top flange 148 as an integral unit. The fabric covering can be removably attached to the panel using hook and loop (e.g. Velcro®) fastener material or other removable attachment devices, as discussed in more detail below. The top flange 148 has an unsupported span between its attachment points at the outboard end 136 and the inboard end 138, and defines a lower boundary of the space 144 suitable for opening the pivot stow bin 126. Connectors are positioned at the inboard attachment point 146 and the outboard attachment point 147 of the fabric panel 134. These connectors can be attached to the inboard and outboard ends of the top flange 148, and can attach, for example, to the center aisle header 129 and to the outboard rail device, as indicated above.

As shown in FIG. 1, the vertical panel 134 can have a length sufficient to extend below the top of the seatbacks 150 of the aircraft seat structures 118. It is desirable that the curtain extend low enough to be at least slightly below the top of the seatback 150 when the seat is in a fully reclined position, but not so low as to block or hinder use of the seatback tray table (not shown) for the passenger seated behind, or block tray table placards.

The panel 134 can include an internal stiffener 152, shown in outline in FIGS. 1 and 2, which extends along the top edge 142 of the panel. The stiffener 152 and the attached top flange 148 are shown in more detail in FIG. 3. The stiffener 152 can be a lightweight fiberglass panel, for example. Other materials can also be used, such as thermoset or thermoform polymer sheet materials. It is desirable that such materials resist plastic deformation while being certifiable for low flammability. In one embodiment, the stiffener is a substantially planar fiberglass panel having a thickness of about 0.023." Other materials and other thicknesses can also be used. Additional aspects of the stiffener panel are discussed in more detail below. The stiffener 152 can include a tail 154, extending generally downwardly at the outboard end 136 of the panel, near the aircraft sidewall 124. This tail 154 provides a level of rigidity to hold the outboard end of the panel 134 generally against the sidewall 124, so that the curtain panel 134 does not droop downward from the outboard attachment point 147 and away from the sidewall 124. This allows the divider panel 134 to substantially completely block the view between the adjacent rows of seats. Additional features of the embodiment shown in FIG. 1 are discussed in more detail below.

Shown in FIG. 2 is a front view of the divider curtain 132 of FIG. 1. As shown in FIG. 2, this embodiment can include a tieback strap 130 that can be used to retract and hold the center aisle curtain 128 open along with an inboard portion of the vertical panel 134, similar to the configuration shown in FIG. 7 and discussed in more detail below. The inboard edge 139 of the panel 134 is flexible, and in this configuration can be folded back against the inboard curve 135 of the internal stiffener 152. When the center aisle curtain 128 is retracted in this way, the bottom edge 140 of the remainder of the vertical panel 134 remains fully down. The view of FIG. 2 also shows releasable fasteners 177 (e.g. magnets) that releasably attach the outboard edge of the center aisle curtain (128 in FIG. 1) to the inboard edge 139 of the vertical panel 134, in a manner like that discussed above. Other aspects of this embodiment are also as discussed above.

As discussed above, the divider curtain 132 also includes a top flange 148, which provides a horizontal portion that is flexibly attached to the substantially vertical panel 134 along the top edge 142 and extends from the outboard end 136 to the inboard end 138. This top flange 148 is oriented substantially perpendicular to the substantially vertical panel portion 134, and has a substantially continuous curvature. The top flange 148 imparts forward and aft stability to the vertical panel 134 at the top edge 142 by giving it a "T" shaped cross section. The horizontal portion or flange 148 is flexibly attached to the vertical panel portion 134 along the top edge 142.

Figure 3:
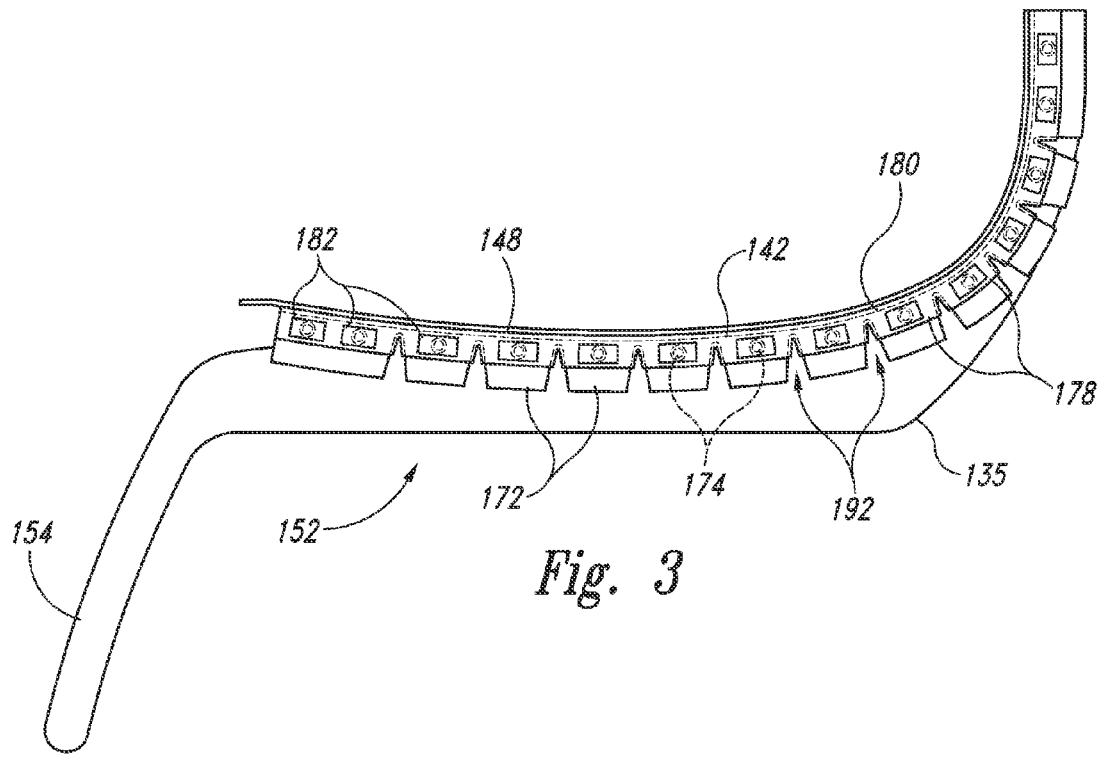
FIG. 3 is a plan view of an embodiment of a top edge stiffener for a curtain support member in accordance with the present disclosure.

Provided in FIG. 5 is a cross-sectional view of the vertical panel 134 of the divider curtain 132, and shows both the horizontal 148 and vertical portions 134, and the internal stiffener 152. A plan view of the internal stiffener 152 and the related stiffener assembly is shown in FIG. 3. It is to be understood that the thicknesses and lateral spacing of some elements shown in FIG. 5 are exaggerated for illustrative purposes. Specifically, an actual divider curtain configured in accordance with the present disclosure will generally appear flatter than shown in FIG. 5. The top flange 148 is oriented substantially perpendicular to the vertical panel 134, and in this embodiment two layers of panel fabric enclose and flexibly attach the vertical panel 134 and the top flange 148 as an integral unit. In this embodiment, the top flange 148 includes an internal strap 160 that is made of multiple stitched plies of fabric, disposed within a fabric sleeve 162 along the top edge 142 of the vertical panel 134. The internal strap 160 can include two layers of heavy nylon webbing 162, covered by two outer layers of nylon sheet material 164, and stitched together with a single center stitch 166. The nylon sheet material 164 provides torsional stiffness to the strap 160. The torsional stiffness combined with the contour of the top edge 142 keeps the top flange 148 perpendicular to the panel 134. The heavy nylon webbing 164 can be similar to high strength backpack strap material, and the two layers can be created using a single length of this material looped back over itself, so as to provide loops at its outboard end where attachment hardware for the divider curtain 132 is connected.

The internal strap 160 is held within a sleeve 168 that is created by a layer of reinforcing fabric 170, attached to opposing sides of the vertical internal stiffening panel 152 and looped around above. The reinforcing fabric can include lower tab portions 172 that are attached to the internal stiffening panel 152 by setting an eyelet 174 or the like into a washer. A layer of decorative fabric 176 can then be disposed over the reinforcing fabric 170, with lower tab portions 178 that cover the eyelet/washer 174. A horizontal stitch 180 that extends through the reinforcing fabric 170 and the decorative fabric 176 just below the internal strap 160 completes the sleeve 168.

In one embodiment, the internal strap 160 is stitched to the reinforcing fabric 170 and the decorative fabric 176 that form the sleeve 168 by a vertical stitch 166 down the center line of the strap assembly. This vertical stitch 166 also intercepts the horizontal stitch 180, and thus helps maintain the shape of the panel 134 against any force from the bottom of the curtain 132, so that the curtain is well supported. This configuration, with the horizontal stitch 180 and vertical stitch 166 overlapping each other, keeps the whole assembly flexible, without creating a rigid interface between the top flange 148 and the vertical panel 134. A rigid interface between the top flange 148 and the vertical panel 134 would make the entire divider curtain 132 rigid. On the other hand, it is considered desirable that the divider curtain 132 be considered a "soft good." In an emergency situation, if the divider curtain 132 becomes detached from its connection points, the flexible connection of the top flange 148 to the vertical panel 134 will allow the top flange to deflect or fold over into a position that is more planar with the vertical panel, so that the whole curtain 132 will tend to bend and fold up. Thus, with the flexible connection, the curtain 132 stays rigid when it is in its normal use configuration, but if the curtain becomes detached, it will tend to fold and its stiffness will drop dramatically, making it less dangerous if it flies through an aircraft cabin. As an added benefit, it is believed that the light weight of the curtain 132 and the flexible connection between the top flange 148 and the vertical panel 134 causes the curtain 132 to feel somewhat delicate, so that passengers are not tempted to grab the curtain and use it as an aid to rise from their seats.

The orientation of the strap 160 within the sleeve 168 is further maintained by virtue of its shape and flexibility characteristics. Naturally, the internal strap 160 is more flexible with respect to its thickness than with respect to its width. Consequently, since the sleeve 168 curves along with the curvature of the top edge 142 of the vertical panel 134, the strap will naturally curve in this way with respect to its thickness, not its width, thus ensuring that the width of the strap 160 will naturally tend to rest substantially perpendicularly with respect to the vertical portion 134 and the internal stiffener panel 152. The torsional stiffness of the strap 160 also helps to keep it in this orientation. This configuration of the sleeve 168 and internal strap 160 integrally but flexibly attaches the top flange 148 to the vertical portion 134 in an orientation that is normally perpendicular to the plane of the internal stiffening panel 152, and thus imparts significant fore-aft strength to the curtain support member 204 in its normal use configuration.

As noted above, the decorative fabric 176 includes lower tab portions 178 that overlie the reinforcing fabric 170 on both sides of the stiffener 152. These lower tab portions 178 include pieces of hook and loop fabric 182 (e.g. Velcro®), or other attaching device, to which decorative cover fabric 184, having its own corresponding hook and loop fabric pieces 186, can be removably attached. The decorative cover fabric 184 can match the decorative fabric 176 that covers the top flange sleeve 168. This fabric 184 extends downward and covers both sides of the internal stiffener 152, and is stitched together at a stiffener pocket stitch 186 just below the lower extremity of the stiffener 152 to form a stiffener pocket 188. The decorative cover fabric 176 and 184 can be drapery fabric, and can cover all features of the vertical and horizontal portions of the curtain support member, to provide a pleasing appearance. As shown in FIG. 5, the decorative fabric cover 176 and 184 can terminate at the bottom edge 140 of the divider curtain 132 in a stitched seam 190.

A plan view of an embodiment of an internal stiffener 152 and the related stiffener assembly, without the fabric cover of the vertical panel 134, is shown in FIG. 3. As noted above, the internal strap 160 of the top flange 148 is held within a sleeve 168 and oriented substantially perpendicular to the top edge 142 of the stiffener 152. The sleeve 168 is created by a layer of reinforcing fabric 170, which is attached to opposing sides of the internal stiffening panel 152 by eyelets/washers 174 through lower tab portions 172. A layer of decorative fabric 176 overlies the reinforcing fabric 170, and this fabric has lower tab portions 178 that cover the eyelets/washers 174. These lower tab portions 178 include the pieces of hook and loop fabric 182 to which the decorative cover fabric 184 is attached. As can be seen in FIG. 3, the tabs 172 and 178 have wedge-shaped gaps 192 between them. This is done for stress relief in that fabric, to allow the fabric to follow the curved shape of the top edge 142 of the stiffener panel 152 in the plane of the fabric. Because the tabs 172 of the heavier reinforcing fabric 170 are securely attached to the internal stiffener 152 with eyelets/washers 174, and the decorative fabric cover 176 is stitched to the reinforcing fabric 170 along the horizontal stitch 180, the two fabric layers flexibly attach the top flange 148 to the internal stiffening panel 152. Where a single internal stiffening panel 152 is used, as in the embodiment of FIG. 5, this panel can be selected to have a thickness and stiffness suitable for holding the tail 154 against the sidewall of the aircraft (124 in FIG. 1) without drooping.

A cross-sectional view of another embodiment of a divider curtain 332 is shown in FIG. 6. This embodiment is similar to the embodiment shown in FIG. 5, but includes three internal stiffener panels 352, including a central stiffener panel 352*a* and two outside stiffener panels 352*b*. Like the divider curtain embodiment discussed above, this embodiment provides a divider curtain 332 having both a horizontal portion or top flange 348 and a vertical portion 334. As with the view of FIG. 5, it is to be understood that the thicknesses and lateral spacing of some elements shown in FIG. 6 are exaggerated for illustrative purposes. The top flange 348 is oriented substantially perpendicular to the vertical panel 334, and two layers of panel fabric enclose and flexibly attach the vertical panel 334 and the top flange 348 as an integral unit. The top flange 348 includes an internal strap 360 that can be made of multiple stitched plies of fabric, disposed within a fabric sleeve along the top edge 342 of the vertical panel 334. The internal strap 360 can be configured and attached as discussed above.

The internal strap 360 is held within a sleeve 368 that is created by a layer of reinforcing fabric 370, which is attached to opposing sides of the central stiffening panel 352*a* and looped around above. The reinforcing fabric includes lower tab portions 372 that are attached to the central stiffening panel 352*a* by setting an eyelet 374 or the like into a washer. A layer of decorative fabric 376 can then be disposed over the reinforcing fabric 370, with lower tab portions 378 that cover the eyelet/washer 374. These lower tab portions 378 include pieces of hook and loop fabric 382 (e.g. Velcro®), or other attaching device, to which decorative cover fabric 384, having its own corresponding hook and loop fabric pieces 386, can be removably attached. The decorative fabric 384 extends downward on both sides of the internal stiffener 352, and is stitched together at a stiffener pocket stitch 386 just below the lower extremity of the stiffener 352 to form a stiffener pocket 388.

Figure 4:
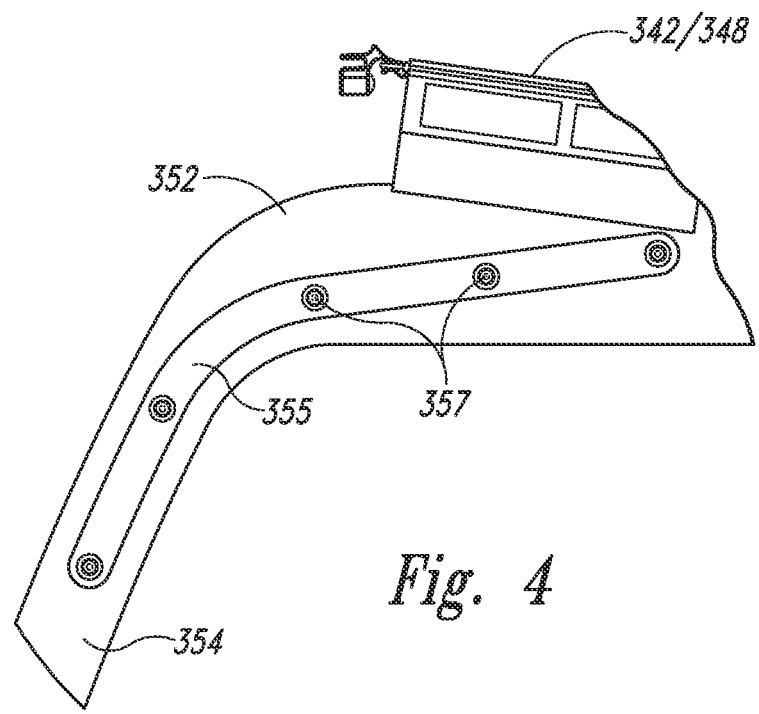
FIG. 4 is a detail view of an embodiment of a stiffener tail, having an additional stiffener arm attached to it.

As with the embodiments discussed above, the central stiffener 352*a* can include a tail 354, extending generally downwardly at the outboard end 336 of the panel, near the aircraft sidewall. Attached to this tail is an additional tail stiffener 355, shown in FIG. 4, which can be attached by rivets or eyelets 357. The tail stiffener 355 can comprise two stiffening members, attached on opposite sides of the central stiffener 352*a*. The tail 354 and tail stiffener 355 provide a level of rigidity to hold the outboard end of the panel 334 generally against the sidewall, so that the curtain panel 334 does not droop downward from the outboard attachment point 347 and away from the sidewall, as discussed above. It will be appreciated that the divider curtain embodiment shown in FIG. 5 can also have a tail stiffener 155 attached to the tail in the same manner, as shown in FIG. 2.

In the embodiment of FIG. 6, in order to soften or disguise bulges that may be produced in the decorative fabric panels 384 above the eyelets 374 along the top of the central stiffening panel 352 and above the rivets or eyelet 357 that attach the tail stiffener 355, two additional outer stiffener panels 352*b* are placed in the stiffener pocket 388 outside of the central stiffening panel 352*a* but inside of the lower tab portions 378. The outer stiffener panels 352*b* can have exactly the same shape and configuration as the central stiffening panel 352*a*, but "float" within the stiffener pocket 388. That is, these outer stiffener panels merely rest in the pocket and are not rigidly attached to any other structure. They are held within the pocket 388 when the pocket is closed by attachment of the decorative fabric 384 via the hook and loop fasteners 382, 386. The decorative fabric 384 covers both sides of all three internal stiffeners 352. As shown in FIG. 5, the decorative fabric cover 384 can terminate at the bottom edge 340 of the divider curtain 332 in a stitched seam 390.

Figure 7:
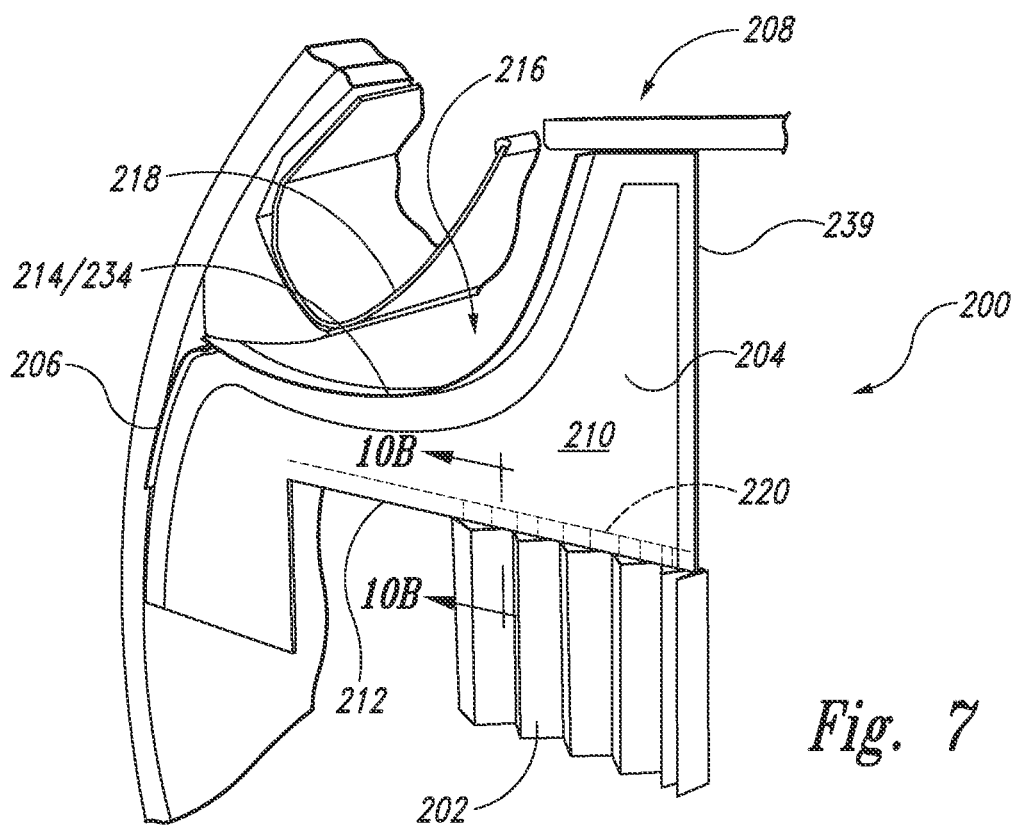
FIG. 7 is a perspective view of another embodiment of a divider curtain in accordance with the present disclosure, having a slidable lower curtain portion.
Figure 8:
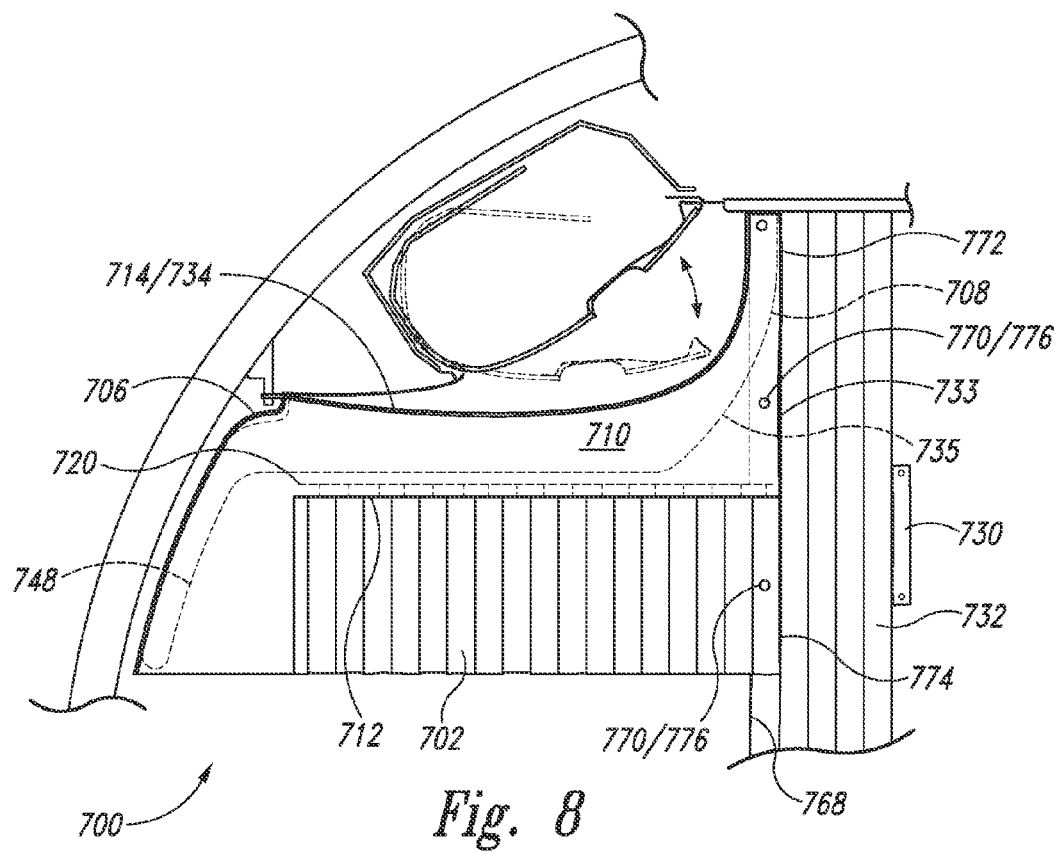
FIG. 8 is a front view of another embodiment of a divider curtain having a slidable lower curtain portion like that of FIG. 7.
Figure 9:
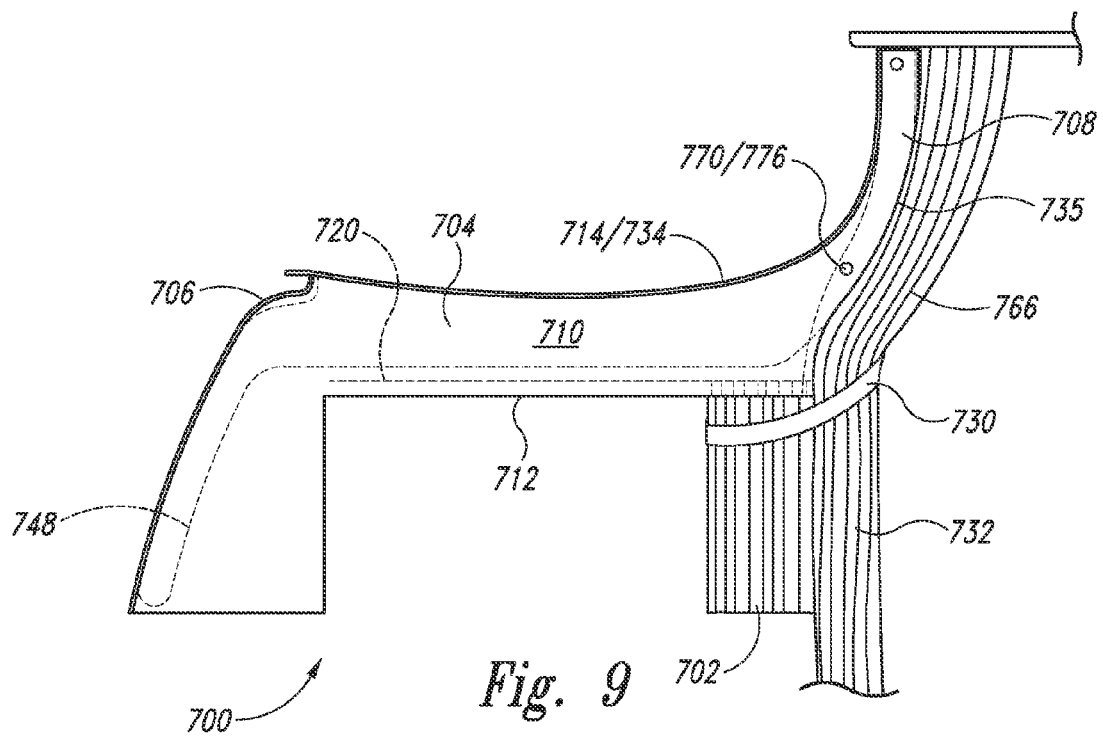
FIG. 9 is a front view of the embodiment of FIG. 8, showing the divider curtain and aircraft center aisle curtain retracted.
Figure 10A:
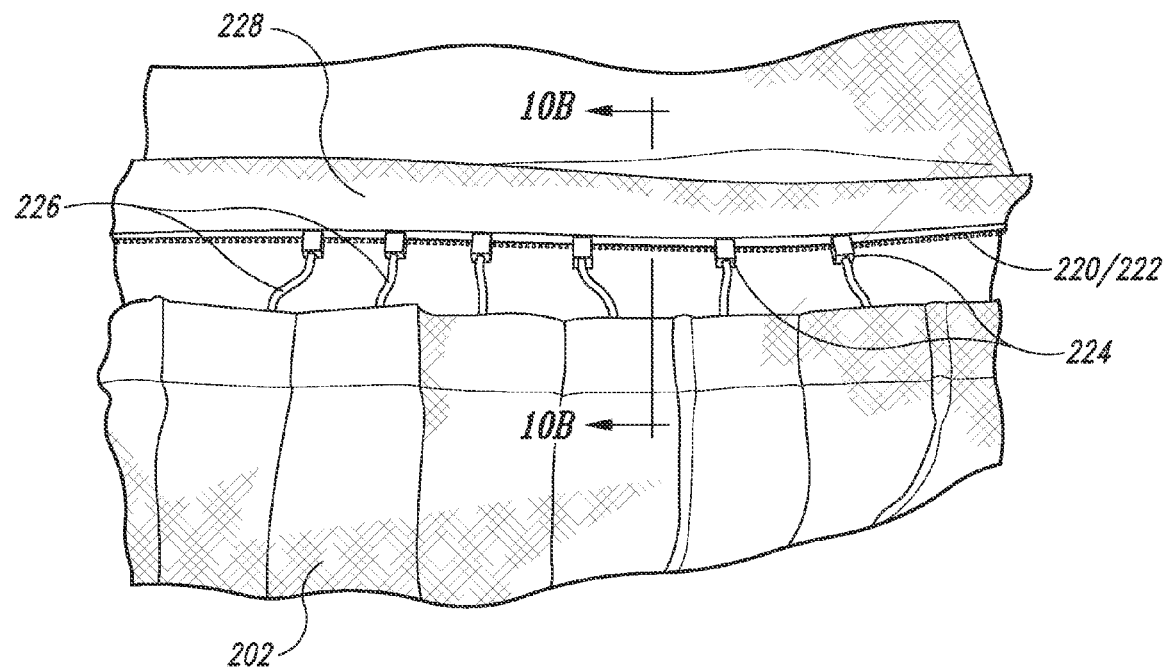
FIG. 10*a* is a close-up view of the curtain attached to the zipper track of the curtain support member of the divider curtain of FIG. 2.

A perspective view of another embodiment of an aircraft divider curtain 200 in accordance with the present disclosure is shown in FIG. 7, and two similar embodiments are shown in FIGS. 8-10. In the embodiment of FIG. 7, the divider curtain 200 includes a slidable curtain 202, and a curtain support member 204, having an outboard end 206 and an inboard end 208, and is attachable to the aircraft interior only at the outboard and inboard ends, in a manner similar to the embodiment discussed in FIG. 1. The curtain support member 204 includes a substantially vertical panel portion 210, which has a substantially straight bottom edge 212, and an arcuate top edge 214 that defines an unsupported span between the outboard end 206 and the inboard end 208, and thus defines a lower boundary of a space 216 sufficient for opening an adjacent pivot stow bin 218.

In this embodiment, a flexible track device 220 is disposed along the straight bottom edge 212 of the panel 210, and slidingly supports the fabric curtain 202, which hangs from it. In one embodiment, the flexible track device 220 is a zipper chain 222, shown in a close-up view in FIGS. 10*a* and 10*b*. A group of sliding elements 224 are slidingly disposed along the zipper chain 222, and the curtain 202 is attached to each of the sliding elements 224 by flexible cords 226. This allows the curtain 202 to be manually extended or retracted along the track device 220 as desired. The zipper chain 222 and sliding elements 224 can be hidden by a fabric flap 228 along the bottom edge 212 of the curtain support panel 204.

In the embodiment shown in FIG. 7, the slidable lower curtain 202 is configured to have a folded and retracted position near the inboard end 208, and can be unfolded and extended outboard to close the curtain 202. The zipper chain 222 or other flexible track device 220 can include a stop block (not shown) or other device at the inboard end 208 to hold the inboard sliding element during the curtain extending operation, to keep the inboard end of the curtain in place. A tieback strap, like that shown in FIG. 2, can be provided to tie and hold the divider curtain 202 and aisle curtain (not shown in FIG. 7) in their retracted positions. It is to be appreciated that the curtain support member 204 shown in FIG. 7 has a substantially vertical inboard edge 239, against which the aisle curtain can abut. Consequently the aisle curtain and divider curtain 202 will naturally tend to fold up in a position substantially aligned with this inboard edge 239.

In this embodiment the sliding elements 224 follow the teeth of the zipper chain 222 and provide lower curtain support while allowing extension and refraction functionality without adding a rigid member. This allows the curtain to be opened, such as during taxi, takeoff and landing of an aircraft, so that the cabin crew can have a substantially complete view of an aircraft cabin (which can be desirable for safety considerations), and yet allow the cabin to be easily separated into discrete sections during the other portions of the flight.

Figure 10B:
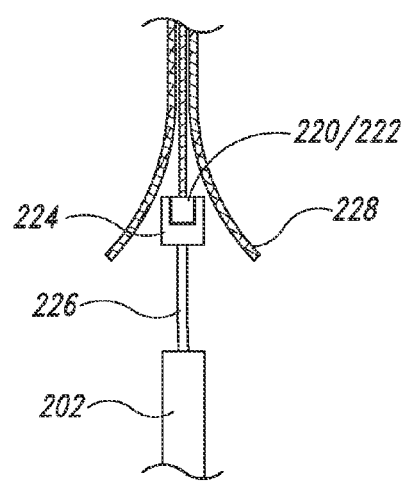
FIG. 10*b* is a partial cross-sectional view of the curtain support member and slidable curtain of the divider curtains of FIGS. 7-10*a*.

The cross-sectional configuration of the divider curtain 200 shown in FIG. 7 can be substantially like that shown in either of FIG. 5 or 6, with the exception of the lower extremity of the curtain. As shown in FIG. 10*b*, below the stiffener pocket stitch 266 the zipper chain 222 can be stitched between two opposing layers of decorative cover fabric 264. The decorative cover fabric terminates in a pair of fabric flaps 228, which serve to conceal the zipper chain 222 and the sliding elements 224 that are attached to it. As noted above, flexible cords 226 and the lower slidable curtain 202 are also shown in the cross-sectional view of FIG. 10*b*.

Shown in FIGS. 8 and 9 are front views of another embodiment of a divider curtain 700 in accordance with the present disclosure. Like the embodiment of FIG. 7, in this embodiment, the divider curtain 700 includes a slidable curtain 702, and a curtain support member 704, having an outboard end 706 and an inboard end 708, and is attachable to the aircraft interior only at the outboard and inboard ends, in a manner similar to the embodiments of FIGS. 1-2 and 7. This embodiment is similar to the embodiment shown in FIG. 7, but includes a curtain support member 704 having a slightly different shape and configuration. The curtain support member 704 includes a substantially vertical panel portion 710, which has a substantially straight bottom edge 712, and an arcuate top edge 714 with a perpendicular top flange 734. A flexible track device 720 is disposed along the straight bottom edge 712 of the panel 710, and slidingly supports the fabric curtain 702, which hangs from it, in the manner discussed above. Other features discussed above with respect to the embodiments of FIGS. 1-2 and 7 and not specifically discussed below are also substantially similar.

As noted above, the curtain support member 204 shown in FIG. 7 has a substantially vertical inboard edge 239, against which the aisle curtain can abut. However, in the embodiment of FIGS. 8 and 9, the inboard edge 733 of the curtain support member 704 is flexible, and can be folded back against the inboard curve 735 of the internal stiffener 748. This aspect is shown clearly in FIG. 9, in which the divider curtain 702 and aircraft center aisle curtain 732 are in the open, retracted position. As in the embodiment shown in FIG. 7, the divider curtain 702 has a folded and retracted position near the inboard end 708, as shown in FIG. 9, and can be unfolded and extended outboard to close the divider curtain 702, as shown in FIG. 8.

A tieback strap 730 can be provided to tie and hold the aisle curtain 732 in its retracted position, along with an inboard portion of the curtain support panel 704, as shown in FIG. 9. In this position, the upper portion of the curtain support member 704, adjacent to the inboard curve 735 of the internal stiffener 748, becomes folded and pushed back against the edge of the internal stiffener 748, along with the upper portion of the center aisle curtain 732. The position of the tieback strap 732 draws the aisle curtain 732 back in a sweeping curve 766. This allows more visibility of the cabin area by a flight attendant from their seated position during taxi, takeoff and landing. It also offers a neater stow configuration for the curtains.

In the embodiment of FIGS. 8 and 9, the aisle curtain 732, the curtain support member 704 and divider curtain 702 can include releasable attachment devices at their adjacent edges. That is, the center aisle curtain 732 can include magnets 770 or other attachment devices disposed at discrete locations along its vertical outboard edge 768. Similarly, the inboard edges 772 and 774 of the curtain support member 704 and divider curtain 702, respectively, can also include corresponding magnetic attachment devices 776 or the like. These attachment devices allow the adjacent edges of these elements to be attached together or detached at will.

Advantageously, the divider curtain disclosed herein provides a free-hanging curtain that is capable of spanning a distance without a track, rod, or other rigid structural support. It provides a flexible curtain that supports itself without tracks or headers, providing a functional curtain between just two support points on each end of a span, in a situation that may not have the structural capability to support a rigid structural support member. An internal support member resists in-plane bending, while being flexible out of plane. The internal support member maintains a desired curtain profile, while the horizontal top flange maintains the curtain's forward/aft upper edge stability. Advantageously, the device can be configured with no physical attachment between the vertical and horizontal portions (i.e. the internal stiffener and top flange assembly) other than being captured by the external fabric and stitching. The "T" shape is stabilized by the horizontal member following a continuous curve, which is maintained by the vertical member. This ensures a non-rigid curtain assembly while providing the desired support to maintain shape.

The lack of a rigid structural support in the curtain of this disclosure allows the curtain to be certified without the structural substantiation associated with a rigid support structure, and therefore does not raise possible projectile concerns when subjected to the emergency landing load conditions. Nevertheless, this curtain provides a fully functioning portion that can be retracted and deployed in the same fashion as any other track-mounted curtain. In one embodiment, the portion of the curtain that is retracted and deployed is flexibly supported on a specially-designed sliding device.

Moreover, the divider curtain disclosed herein uses common, flexible materials to form an esthetically pleasing, yet sturdy suspended curtain. These materials can be assembled to create a suspension-type structure, in which all of the primary supports members are flexible. The curtain support panel has single support points on each end of its span. This panel is attachable to the aircraft interior at the inboard end, inboard of a pivot stow bin, and at the outboard end, below the pivot stow bin near a sidewall of the aircraft.

The present disclosure also provides a method for creating a movable divider for an aircraft interior in accordance with the present disclosure. In one embodiment the method includes creating a vertical portion of a curtain support member having a curved upper edge and a substantially straight lower edge, flexibly attaching a top flange of stranded polymer material to the curtain support member within a fabric sleeve along the upper edge, affixing a plurality of sliders to a slider support, affixing the slider support to the lower edge of the curtain support member, and engaging the sliders with a flexible curtain.

Figure 11:
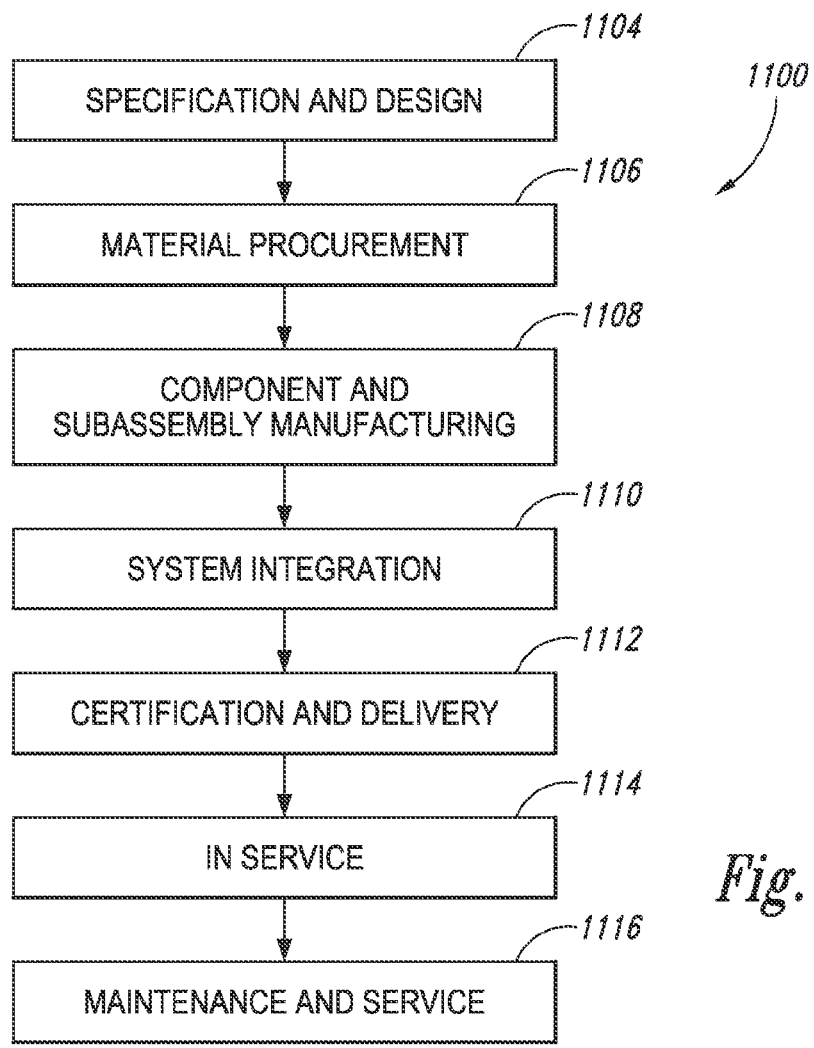
FIG. 11 is a flow diagram of an aircraft production and service methodology.
Figure 12:
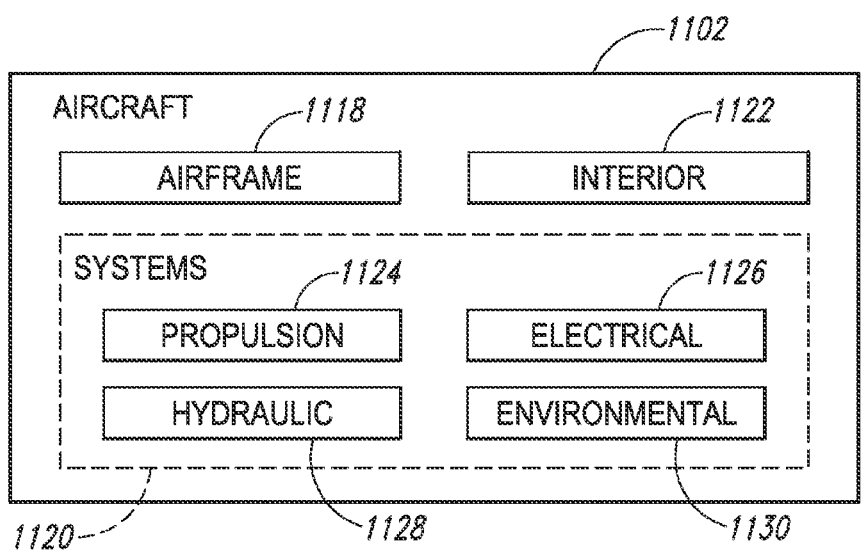
FIG. 12 is a block diagram of an aircraft.

Embodiments of the disclosure may be described in the context of an aircraft manufacturing and service method 1100 as shown in FIG. 11 and an aircraft 1102 as shown in FIG. 12. During pre-production, exemplary method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 416 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 1102 produced by exemplary method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods embodied herein may be employed during any one or more of the stages of the production and service method 1100. For example, components or subassemblies corresponding to production process 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A curtain divider for an aircraft interior containing pivot stow bins, comprising:
    a first fabric curtain, having:
        an outboard end and an inboard end, being attachable to the aircraft interior only at the outboard and inboard ends;
        a substantially planar vertical portion, having a substantially straight bottom edge, and an arcuate top edge defining a space sufficient for opening the pivot stow bins; and
        a substantially planar flange portion, oriented substantially perpendicular to the plane of the vertical portion and flexibly attached to the vertical portion along the top edge and extending from the outboard end to the inboard end, having a substantially continuous curvature, adapted to impart forward and aft stability to the first fabric curtain at the top edge.

2. A curtain divider in accordance with claim 1, further comprising:
    a flexible track device, disposed along the bottom edge;
    a plurality of sliding elements, slidingly disposed along the flexible track device; and
    a second fabric curtain, attached to the sliding elements.

3. A curtain divider in accordance with claim 2, wherein the flexible track device comprises a zipper chain.

4. A curtain divider in accordance with claim 2, wherein the second curtain has a length sufficient to extend below a top of a back of an aircraft seat when the seat is in a fully reclined position.

5. A curtain divider in accordance with claim 1, wherein the first curtain has a length sufficient to extend below a top of a back of an aircraft seat when the seat is in a fully reclined position.

6. A curtain divider in accordance with claim 1, further comprising a stiffener, disposed within the vertical portion and extending along the top edge.

7. A curtain divider in accordance with claim 6, wherein the stiffener comprises a fiberglass panel.

8. A curtain divider in accordance with claim 6, wherein the stiffener includes a tail, extending generally downwardly at the outboard end, configured to hold the outboard end of the first curtain generally against a curved sidewall of the aircraft interior.

9. A curtain divider in accordance with claim 8, wherein the stiffener comprises a central stiffener panel and a pair of outer stiffener panels, disposed on opposite sides of the central stiffener panel, and further comprising a tail stiffener, attached to the tail of the central stiffener panel and disposed inwardly of the outer stiffener panels.

10. A curtain divider in accordance with claim 1, wherein the flange portion is flexibly attached to an internal stiffener, and the vertical portion comprises a fabric covering, removably attachable to the internal stiffener.

11. An aircraft having an interior with pivot stow bins and a curtain divider, the curtain divider comprising:
    a substantially vertical fabric panel, having an outboard end, an inboard end, a substantially straight bottom edge, an arcuate top edge defining an opening space for the pivot stow bins, the panel being attachable to the aircraft interior at the inboard end inboard of a pivot stow bin, and at the outboard end near a sidewall of the aircraft; and
    a substantially planar top flange, disposed along the top edge of the panel and oriented substantially perpendicular thereto, the panel fabric enclosing and flexibly attaching the fabric panel and the top flange as an integral unit, the top flange having an unsupported span between the outboard end and the inboard end and defining a lower boundary of a space suitable for opening the pivot stow bins.

12. An aircraft in accordance with claim 11, wherein the fabric panel includes a tail, extending generally downwardly at the outboard end, configured to hold the outboard end of the fabric panel near the sidewall of the aircraft interior.

13. An aircraft in accordance with claim 12, further comprising:
    a central stiffener, disposed within the vertical fabric panel and attached to the top flange along the top edge, the central stiffener including a tail portion disposed within the tail of the fabric panel;
    a tail stiffener, attached to the tail portion; and
    a pair of outer stiffeners, disposed within the fabric panel on opposite sides of the central stiffener.

14. An aircraft in accordance with claim 11, wherein the fabric panel has a length sufficient to extend below a top of a back of an aircraft seat when the seat is in a fully reclined position.

15. An aircraft in accordance with claim 11, further comprising:
    a flexible track device, disposed along the bottom edge of the panel; and
    a curtain, slidably attached to and descending from the flexible track device.

16. An aircraft in accordance with claim 15, wherein the flexible track device comprises a zipper track, and the curtain is slidably attached to the flexible track device via a plurality of zipper sliders.

17. A method for creating a curtain divider for an aircraft interior containing pivot stow bins, comprising:
    creating a vertical panel having a curved upper edge defining a lower boundary of a space suitable for opening the pivot stow bins, and a substantially straight lower edge;
    flexibly attaching a substantially planar top flange of fabric material substantially perpendicularly to the vertical panel within a fabric sleeve along the upper edge; and
    attaching connectors to inboard and outboard ends, respectively, of the curved upper edge, the connectors being the sole attachment points to attach the vertical panel to the aircraft interior.

18. A method in accordance with claim 17, further comprising creating a tail, extending generally downwardly at the outboard end of the curtain support member, configured to hold the outboard end of the curtain support member against a sidewall of the aircraft interior.

19. A method in accordance with claim 17, further comprising:
   affixing a plurality of zipper sliders to a zipper chain;
   affixing the zipper chain to the lower edge of the vertical panel; and
   engaging the zipper slider teeth with a flexible curtain.

20. A method in accordance with claim 17, further comprising removably attaching a decorative fabric covering to the vertical panel.

\* \* \* \* \*